United States Patent

[11] 3,577,803

[72] Inventor Otto Mueller
 13 Byfield Lane, Dearborn, Mich. 48120
[21] Appl. No. 823,872
[22] Filed May 12, 1969
[45] Patented May 4, 1971

[54] VARIABLE TORQUE TRANSMISSION
 9 Claims, 13 Drawing Figs.
[52] U.S. Cl. .................................................. 74/665,
 192/60
[51] Int. Cl. ....................................................... F16h 37/06
[50] Field of Search .......................................... 74/665, (I),
 (IV), (GI); 192/60

[56] References Cited
 UNITED STATES PATENTS
 3,495,477 2/1970 Mueller ........................... 74/650

Primary Examiner—C. J. Husar
Attorney—Olsen and Stephenson

ABSTRACT: Apparatus for a four or six wheel drive motor vehicle which includes a variable ratio torque transmission assembly connected by drive shafts to front and rear axles. The variable ratio torque transmission assembly has a rotary input member which receives torque from the engine, and first and second rotary output members connected to the front and rear axles respectively. The output members are coupled together by a hydraulic torque transmitting mechanism which includes means for selectively setting the ratio of the input torque that is transmitted to the two output members and thereby to the front and rear axles. This arrangement permits any desired ratio of torque transmission, such as one-third of the torque being transmitted to the front axle and two-thirds of the torque being transmitted to the rear axle. The assembly also includes a remote control means whereby the driver of the vehicle can lock the mechanism between the two output members so that full or maximum torque is transmitted to the front axle.

Patented May 4, 1971

INVENTOR
OTTO MUELLER

BY
Olsen and Stephenson
ATTORNEYS

INVENTOR
OTTO MUELLER
BY
*Olsen and Stephenson*
ATTORNEYS

INVENTOR
OTTO MUELLER

BY
Olsen and Stephenson
ATTORNEYS

INVENTOR
OTTO MUELLER

BY
Olsen and Stephenson
ATTORNEYS

VARIABLE TORQUE TRANSMISSION

BACKGROUND OF THE INVENTION

The present invention pertains to a torque transmitting assembly adapted primarily for use with four and six wheel drive vehicles to provide desired torque transmitting characteristics.

To provide optimum efficiency and performance in four and six wheel drive vehicles, it is desirable that the ratio of torque transmitted to the front and rear axle shafts be selectively set to serve best the particular purposes for which the vehicle was designed, and also to permit the operator of the vehicle to utilize the torque available as it is needed at particular axle shafts. It is also desirable that the drive system accommodate any undesirable winding of a propeller shaft that might occur between the front and rear wheel drives.

The present invention is directed to a drive system that can meet these requirements. Apparatus is provided wherein the torque supplied from the engine is delivered to an assembly through which the ratio of torque distribution to front and rear wheel drives can be selectively set. For example, if it is desired to transmit one-third of the torque to the front axle and two-thirds of the torque to tandem rear axles, this can readily be accomplished simply by making a proper setting of a torque selector means, and if it is desired to apply maximum torque to the front wheels during driving conditions, such, for example, as when the rear wheels may have poor or no traction, this can be accomplished merely by actuation of a remote control mechanism.

According to a preferred form of the present invention, a torque transmitting assembly is provided comprising a stationary housing, a first rotary element journaled in the housing, a rotary input shaft or member adapted to be driven by the engine and extending into said housing and connected for rotation with said first rotary element. A second rotary element is disposed within said housing adjacent to the first rotary element, and a first rotary output member or shaft is connected to the front axle and extends into the housing and is connected for rotation with the second rotary element. A second rotary output shaft or member is connected for rotation with the input shaft or member and is adapted to supply torque to the rear axle. Hydraulic means are coupled between the two rotary elements and are operable under predetermined hydraulic pressure conditions to transmit a selected ratio of the input torque from the input shaft or member to the first rotary output shaft or member with the remainder of the torque being transmitted from the input shaft or member to the second rotary output shaft or member. Selector means for setting the predetermined hydraulic pressure conditions under which the hydraulic means will operate are provided so as to permit the setting of the ratio of torque that is transmitted to the output shafts or members. Remote control means are associated with the selector means for locking the hydraulic means in a position so that, in effect, a direct drive from the input shaft to the two output shafts is provided. By virtue of this remote control means, if the rear axle assembly should lose traction, the drive from the engine can go directly to the front axle assembly.

Thus, it is an object of the present invention to provide an improved variable ratio torque transmission assembly which can be used in conjunction with four or six wheel drive vehicles, although the assembly is not necessarily limited to this particular application.

Other objects of this invention will appear in the following description and appended claims, reference being had to the accompanying drawings forming a part of this specification wherein like reference characters designate corresponding parts in the several views.

DESCRIPTION OF THE PREFERRED EMBODIMENT

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

Figure 1:
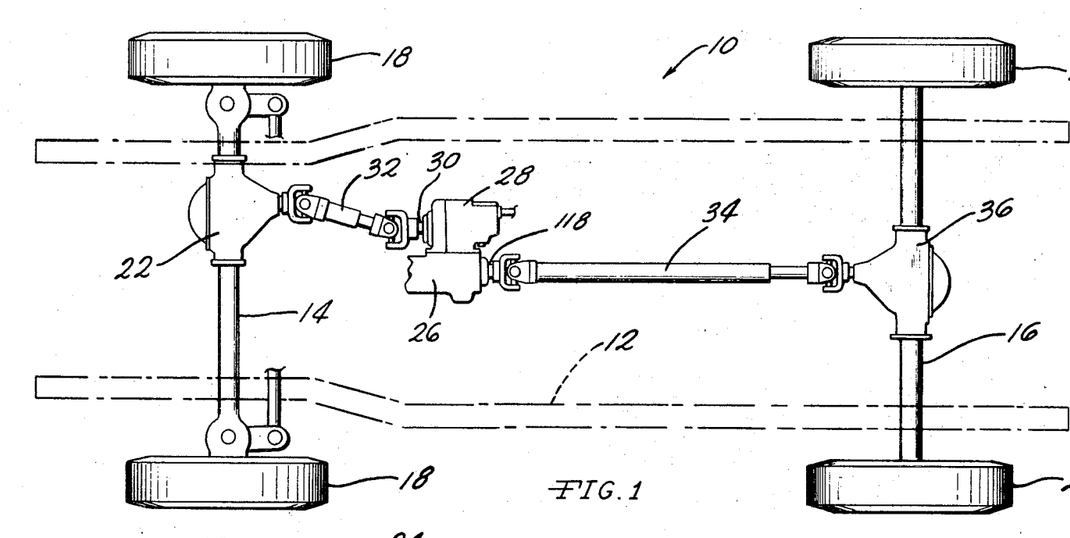
FIG. 1 is a fragmentary schematic top plan view showing a drive assembly of a four wheel drive vehicle containing an embodiment of the present invention.
Figure 2:
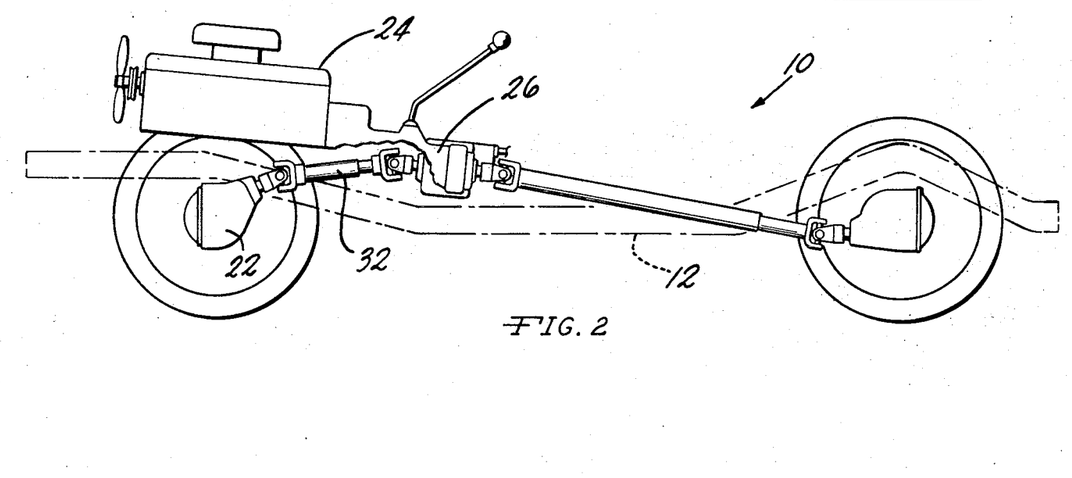
FIG. 2 is a side elevational view showing the drive assembly of FIG. 1.

Attention is now directed to FIGS. 1 and 2 for a description of a vehicle in which the present invention is adapted to be employed. Only portions of the vehicle are shown so that the drive system can be seen more readily. The vehicle 10 has a conventional frame 12 which is suitably supported on a front axle assembly 14 and a rear axle assembly 16. The illustrated vehicle 10 is a four wheel drive; that is, both of the front wheels 18 are driving wheels, as are the rear wheels 20. To assure positive drive to both wheels 18, a differential transmission 22 of the type disclosed in U.S. Letters Pat. Nos. 3,198,035; 3,230,795; 3,393,582 or 3,393,583 may be used. It is to be understood, however, that the present invention is not restricted to the use of locking differentials of this type, since any other conventional type of locking differential may also be employed.

The vehicle 10 is provided, in a conventional manner, with an internal combustion engine 24 and a transmission 26. Mounted adjacent to the transmission 26 is a variable ratio torque transmitting assembly 28 which contains at least one gear in mesh with the gear of the transmission 26 to be driven thereby. This arrangement will be described subsequently when the torque transmitting assembly 28 is described in greater detail.

Extending from the forward end of the torque transmitting assembly 28 is a rotary shaft 30 which is connected by the propeller shaft 32 to the differential transmission 22.

Also connected to the transmission 26 to be driven thereby is the propeller shaft 34 which is drivingly connected to the locking-type differential transmission 36 forming a part of the rear axle assembly 16. The differential transmission 36 can be constructed substantially the same as the differential 22.

From the foregoing description it is to be understood that all four of the drive wheels 18, 20 are drivingly connected to the motor 24, and the axle assemblies 14 and 16 are provided with locking-type differentials 22 and 36 so that if any of the drive wheels 18, 20 should lose traction, the remaining wheels will continue to receive substantially all of the driving torque for moving the vehicle.

Figures 3, 4:
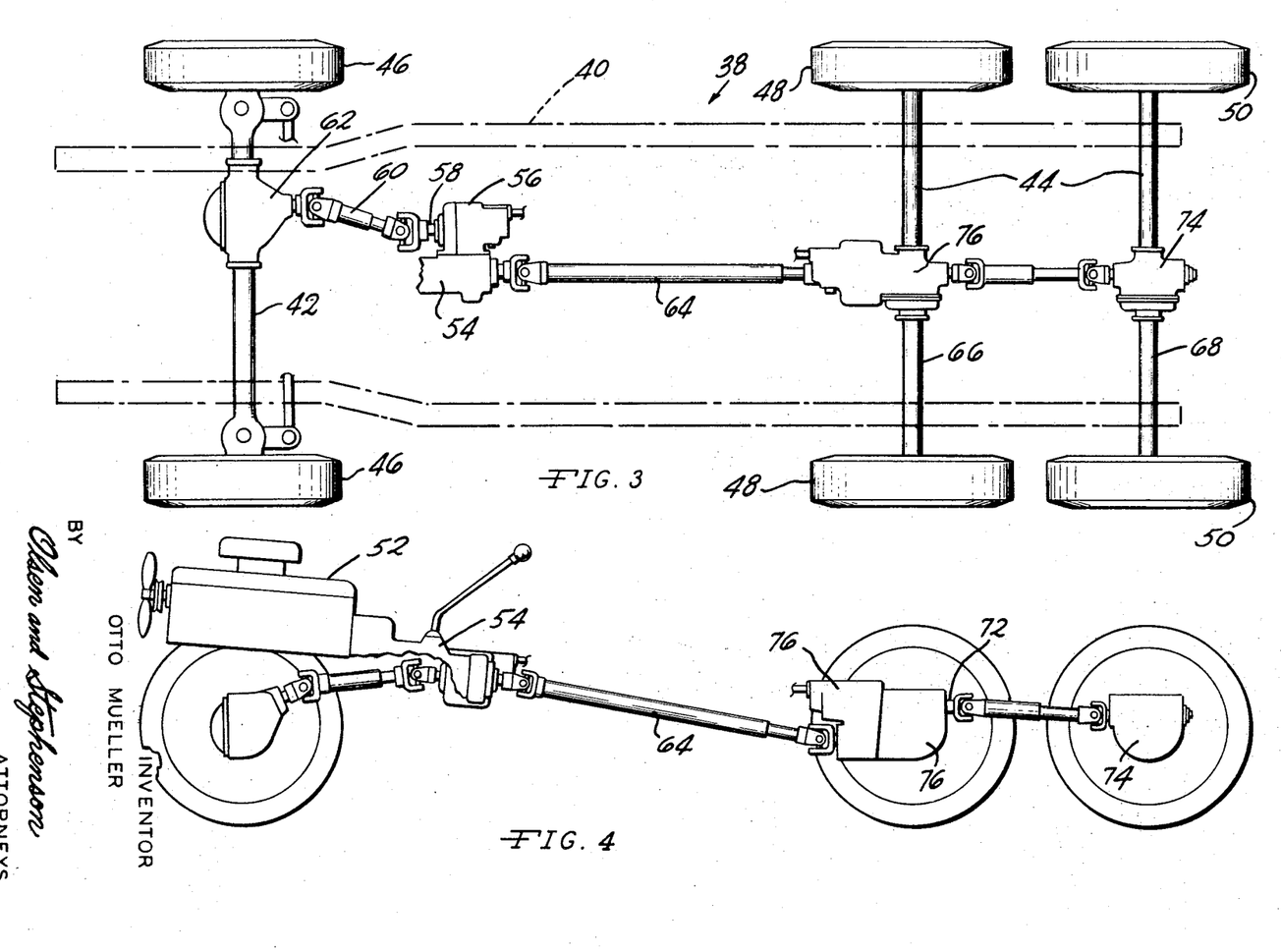
FIG. 3 is a fragmentary schematic top plan view showing the drive assembly of a six wheel drive vehicle containing an embodiment of the present invention.
FIG. 4 is a side elevational view showing the drive assembly of FIG. 3.

The torque transmitting assembly 28 is not limited in its use to the specific vehicle illustrated in FIGS. 1 and 2, but it can also be used in other arrangements, such as the six wheel drive vehicle illustrated in FIGS. 3 and 4, to which attention is now directed.

As is there shown, the motor vehicle 38 has a conventional frame 40 which is suitably supported on a front axle assembly 42 and a rear tandem axle assembly 44. The illustrated vehicle 38 has a six wheel drive; that is, both of the front wheels 46 are driving wheels, as are the tandem front wheels 48 and the tandem rear wheels 50. To assure positive drive to the wheels 46, 48 and 50, locking-type differential transmissions of the type illustrated at 22 and 36 in the vehicle 10 may be used.

The vehicle 38 is also provided, in a conventional manner, with an internal combustion engine 52 and a transmission 54. A variable ratio torque transmitting assembly 56 is mounted adjacent to the transmission 54 and is drivingly connected thereto by means of gearing, as will presently be described.

Connected to the rotary member or shaft 58 is a propeller shaft 60 which is drivingly connected to the differential 62, which may be constructed the same as the differential 22 illustrated in the embodiment of FIGS. 1 and 2. Connected to the transmission 54 to be driven thereby is the propeller shaft 64 for supplying power to the tandem wheels 48 and 50. Various arrangements can be provided for supplying power to the front axle unit 66 of the tandem wheel assembly and to the rear axle unit 68. In the preferred arrangement illustrated in FIGS. 3 and 4, the propeller shaft 64 can be drivingly connected to a variable ratio torque transmitting assembly 70 which is mounted in a reverse position to the position of the corresponding assembly illustrated at 56. An output shaft member 72 is then drivingly connected to the locking-type differential 74 forming a part of the rear axle unit 68. The front axle unit 66 of the tandem wheel assembly also includes a locking-type differential 76 through which an output member of the torque transmitting assembly 70 delivers power to the wheels 48.

From the foregoing description it is to be understood that all of the six drive wheels 46, 48 and 50 are drivingly connected to the motor 52, and the axle units 42, 66 and 68 are provided with locking-type differentials 62, 76 and 74 so that if any of the drive wheels 46, 48 and 50 should lose traction, the remaining wheels will continue to receive substantially full driving torque for moving the vehicle.

As previously indicated, the present invention is directed toward an improved vehicle drive system wherein a variable ratio torque transmitting assembly is provided for selecting the ratio of torque that is transmitted from the engine to each of the axle units. Thus, when a four wheel drive is used, the torque transmitting assembly 28 is constructed and arranged so that any selected ratio of the torque supplied by the engine 24 can be delivered to the front and rear axle assemblies 14 and 16. Similarly, with respect to the embodiment of the invention illustrated in FIGS. 3 and 4, the torque transmitting assembly 56 can be used to deliver any desired ratio of torque from the engine 52 to the front axle unit 42 and the tandem rear axle assembly 44. In a similar manner, the torque transmitting assembly 70 can be used to deliver a selected ratio of torque from the propeller shaft 64 to each of the individual rear axle units 66 and 68. As will presently be described, the torque transmitting assemblies are constructed and arranged so that the driver of the vehicle can at his option shift the torque transmitting assemblies to a second position wherein the torque will not be distributed according to the selected ratios, but instead a substantially direct drive will be provided through the torque transmitting assemblies.

Referring now to FIGS. 5—13, inclusive, the details of the preferred embodiment of the torque transmitting assembly 28 will be described in greater detail.

Figure 5:
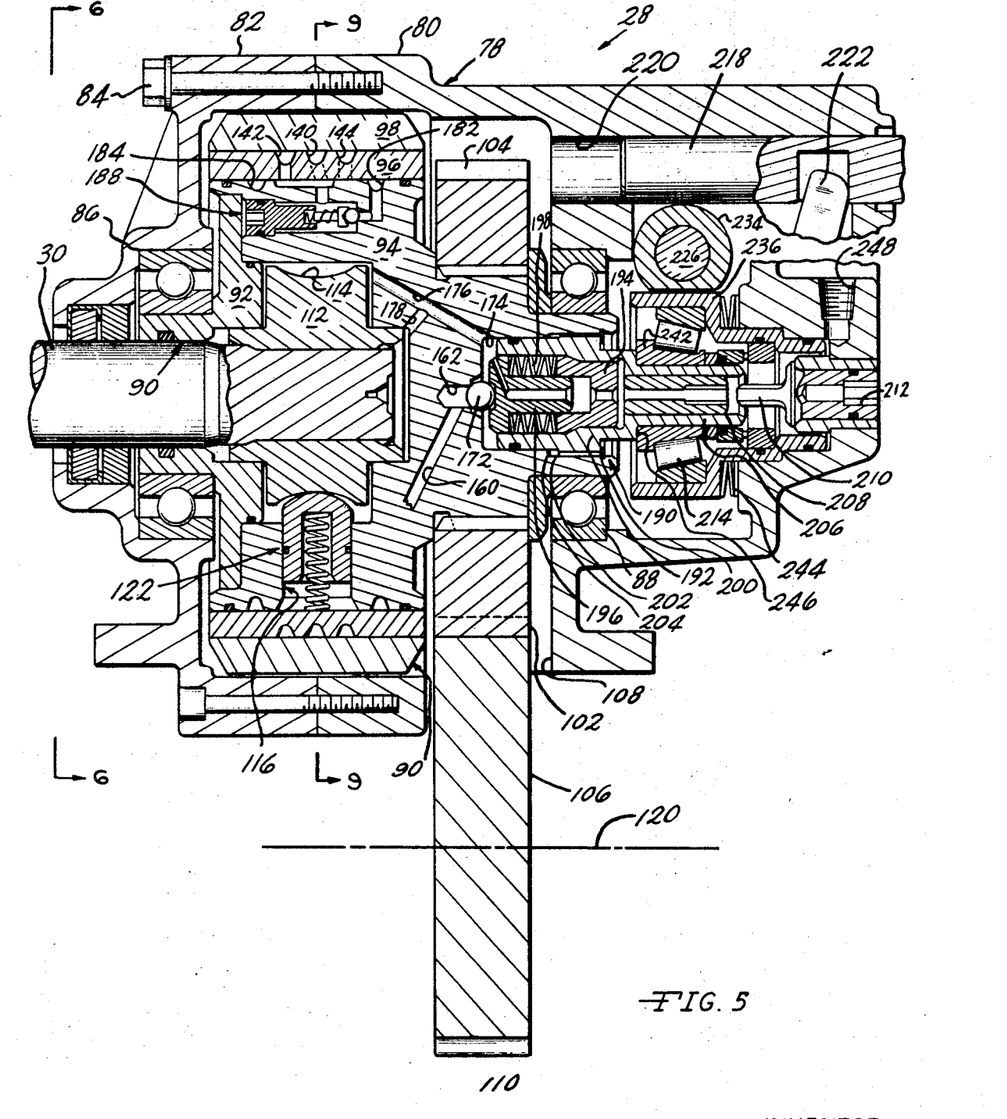
FIG. 5 is an enlarged section through a torque transmitting assembly embodying the present invention.
Figure 6:
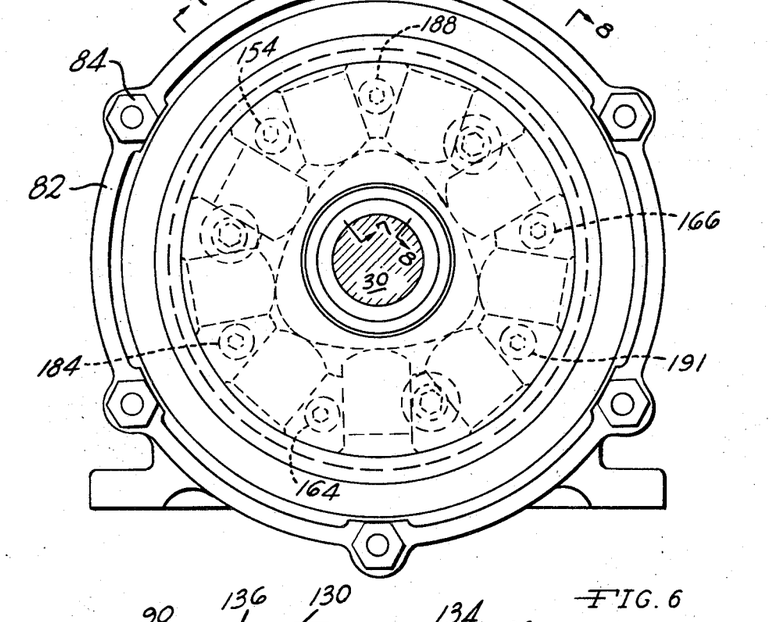
FIG. 6 is an end elevational view as seen from the lines 6-6 of FIG. 5.
Figure 8:
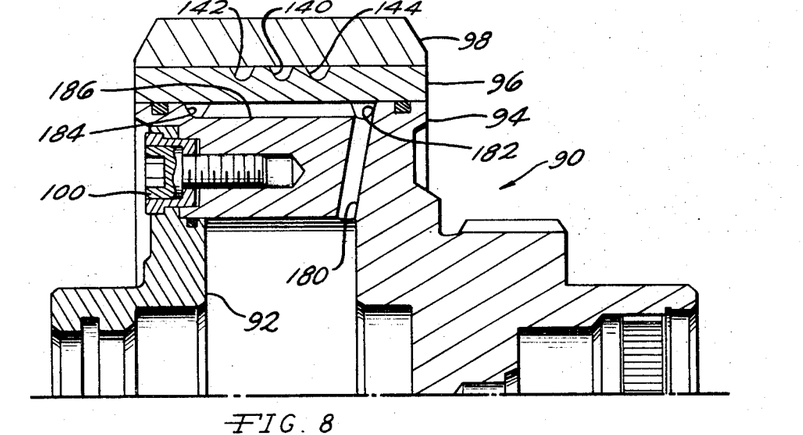
FIG. 8 is a fragmentary section of the same rotary element taken on the line 8-8 of FIG. 6.

The torque transmitting assembly 28 includes a stationary housing 78 which has a first housing section 80 and a second housing section 82 suitably secured together, such as by the plurality of bolts 84. Journaled in the housing 78 by means of the bearings 86 and 88 is a first rotary element 90 which is formed from a plurality of segments 92, 94, 96 and 98. The segments 92 and 94 are secured together by a plurality of bolts 100, as shown in FIG. 8, and the segments 96 and 98 can be press-fitted or otherwise secured together in their illustrated positions. Mounted on the first rotary element 90 is a ring gear 102 which has an internal spline connection with the first rotary element 90 so as to rotate therewith, and it has external gear teeth 104 around its outer periphery. The gear teeth 104 are in mesh with a rotary input member 106 which extends into the housing 78 through the opening 108. It will be recognized that the ring gear 102 can be omitted and the gear teeth 104 formed directly on the first rotary element 90, but it is desirable to have a two-piece construction of the type illustrated and described so that the gear transmitting assembly 28 can be used for a relatively wide variety of applications, and the gear ratio between the rotary member 106 and the first rotary element 90 can be selected merely by proper selection of the ring gear 102 and the gear or rotary input member 106.

Also contained within the housing 78 is a second rotary element 112 which is drivingly connected to the first rotary output member 30, which, as previously described, is adapted to provide a driving connection to the front axle unit of the vehicle. As can be seen best in FIGS. 5 and 9, the second rotary element 112 is coaxially disposed within the first rotary element 90, and it has external cam surfaces 114 located radially inwardly of a complementary portion of the segment 94 of the first rotary element 90 in which segment are located a plurality of pressure chambers 116, the purpose of which will be described hereinafter.

From the foregoing description it will be recognized that the housing 78 contains a first rotary element 90 which is journaled within the housing and which is drivingly connected to the rotary input member 106 which forms a part of the transmission 26, and a second rotary element 112 which is drivingly connected to the first rotary output member 30 drivingly connected to the front axle unit 14. As is shown best in FIGS. 1 and 2, a second rotary output member 118, located on the axis 120 is connected for rotation with the input member 106. Thus, a direct drive is provided between the engine 24 and the one output member 118, and a drive is also provided from the input member 106 to the first rotary element 90, and from there through the second rotary element 112 to the first output shaft 30 via a hydraulic means 122 which is adapted to couple the rotary element 90 and 112 together and operable under predetermined hydraulic pressure conditions to transmit a selected ratio of the input torque from the input member 106 to the first output member 30 with the remainder of the torque being transmitted from the input member 106 to the second rotary output member 118. This hydraulic means 122 will now be described.

The hydraulic means 122 includes the three equiangular rise and fall cam surfaces 114, the pressure chambers 116, the spring actuated pistons 124 positioned in each of the chambers 116, and the plurality of hydraulic fluid passageways within and between the two rotary elements 90 and 112 as well as the various valves associated with these passageways. As seen best in FIG. 9, the pressure chambers 116 are in three sets, the first set being the pressure chambers 126, the second set being the pressure chambers 128 and the third set being the pressure chambers 130; and the pistons 124 are similarly in three sets comprising the first set 132, the second set 134 and the third set 136. The radially inner ends of the pistons 132, 134 and 136 are contoured to provide a maximum contact while traveling on the cam surface 114. These pistons also have hollow interiors in which are located coil springs 138 for biasing the pistons against the cam surface 114 so that the pistons will reciprocate upon rotation of the first rotary element 90 with respect to the second rotary element 112. Thus, when such relative rotation occurs, the pistons will reciprocate to provide a pumping action within the pressure chambers for a purpose to be described.

In its normal operating position, the torque transmitting assembly 28 will be filled with a hydraulic fluid, and the pressure chambers 116 and the passageways to be described which form part of the hydraulic means 122 will also be completely filled with the hydraulic fluid. Under these circumstances, relative rotation between the first rotary element 90 and the second rotary element 112 will be restricted to the extent that the pistons 124 can displace the hydraulic fluid from the pressure chambers 116. To permit such displacement to occur at a controlled rate, suitable passageways have been provided which will now be described.

Figure 9:
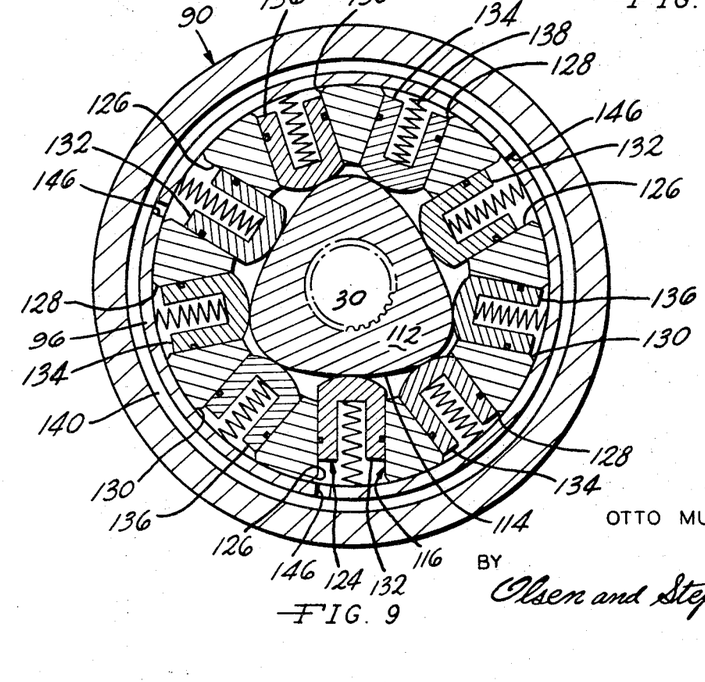
FIG. 9 is a fragmentary section taken on the line 9-9 of FIG. 5.

Each set of the pressure chambers 116 has passageways providing communication between its pressure chambers. Thus, pressure chambers 126 are in communication with one another in part by the passageway 140, the pressure chambers 128 are in communication with one another in part by the passageway 142, and the pressure chambers 130 are in communication with one another in part by the passageway 144. As shown in FIG. 9, the passageway 140 is an annular groove which is located in the segment 96 through which ports 146 extend between the passageway 140 and the chambers 126. Similar ports 148 extend through segment 96 providing communication between the passageway 142 and the chambers 128, and ports 150 provide communication between the passageway 144 and the pressure chambers 128.

Figure 7:
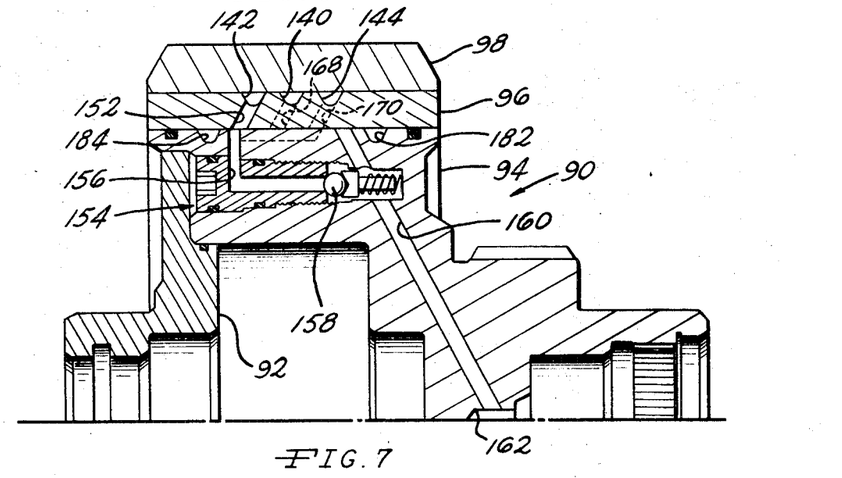
FIG. 7 is a fragmentary section of one rotary element of the invention taken on the line 7-7 of FIG. 6.
Figure 10:
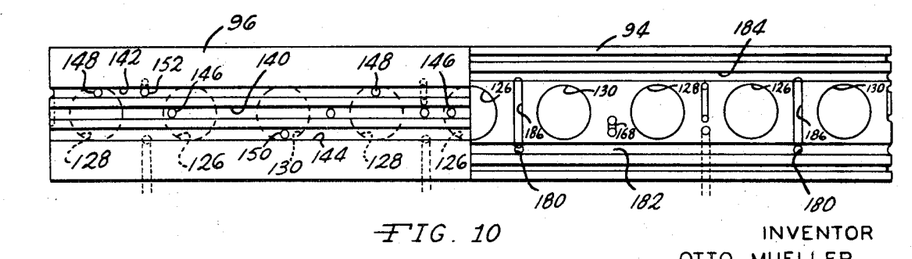
FIG. 10 is a developed view in two different places of the fluid passageways in the rotary element shown in FIGS. 7 and 8.

To permit hydraulic fluid to be displaced from each set of pressure chambers and its associated annular passageway, a hydraulic discharge circuit is provided, and attention is directed to FIGS. 7 and 10 for a brief explanation of this circuit. As there shown, a discharge duct 152 is shown providing communication between the passageway 142 and the check valve 154. The latter has a duct 156 extending through it in which is located the spring actuated ball check element 158 which when moved by hydraulic pressure to an open position permits fluid communication with the passageway 160 which discharges into the chamber 162. Similar check valves 164 and 166 are associated with the passageways 140 and 144 by similar ducts 168 and 170, such check valves and ducts being radially displaced as shown by the locations of the check valves in FIG. 6. Each of the check valves 154, 164 and 166 have similar discharge passageways 160 associated therewith in communication with the chamber 162. By virtue of this arrangement, reciprocation of the pistons 124 can occur, permitting relative rotation between the rotary element 112 and the rotary element 90. When such reciprocation occurs, fluid can be discharged from each pressure chamber through its radial duct to the associated passageway 140, 142 or 144, and from there through its check valve 154, 164 or 166 to the passageway 160 associated therewith, and from there into the chamber 162. As will subsequently be described, the extent to which the hydraulic fluid can be discharged from the three sets of pressure chambers will be controlled by the operation of the ball check valve 172.

For the present apparatus to remain operational, it is necessary that the hydraulic fluids that are discharged from the pressure chambers on the discharge stroke of the pistons be replenished on the suction strokes of the pistons. This is accomplished by means of the suction circuit provided, which will now be described.

As previously indicated, hydraulic fluid can be discharged from the pressure chambers 116 only at the rate that corresponding volumes of hydraulic fluid can pass from the chamber 162 through the ball check element 172 into a chamber 174. The latter chamber is in communication with the interior of the rotary element 90 by the passageways 176 and 178, FIG. 5. As shown in FIG. 8, a passageway 180 provides communication between the interior of the rotary element 90 and a pair of annular grooves or passageways 182 and 184 which are formed in the segment 94. A groove or passageway 186 extending parallel to the axis of the rotary element 90 is in communication with the passageways 182 and 184. As shown in FIG. 5, a check valve 188 is positioned to provide communication between the passageway 182 and the annular groove 142 so that when a pressure drop occurs in the groove 142 by virtue of movement of the pistons 134 during their suction strokes, fluid will flow from the annular duct 182 through the check valve 188 to the pressure chambers 128. As seen best in FIG. 6, similar check valves 189 and 191 are located in similar passageways providing communication between the annular groove or passageway 182 and the annular passageways 140 and 144 so that when movement of the pistons associated with these annular passageways occurs during their suction strokes, fluid is available and can flow to maintain these cylinders in a filled condition.

From the foregoing description it will be understood that when the ball check element 172 is in a closed position, no fluid can be displaced from the three sets of pressure chambers, and therefore, no relative turning can occur between the rotary element 90 and the rotary element 112. However, when the ball check element 172 is moved to an open position, hydraulic fluid can be displaced from the pressure chambers 116 and can be discharged via the ducts 160 and the chamber 162 through the port in which the ball check element 172 is located into the chamber 174. The extent of opening of this port will control the rate at which relative rotation can occur between the two rotary elements 90 and 112. The hydraulic fluid that passes through the port in which the ball check element 172 is located will be returned to the hydraulic pressure cylinders 116 on the suction strokes of the pistons 124. Thus it can be understood that when the torque transmitting assembly 28 is used in an arrangement such as is shown in FIGS. 1 and 2 of the drawings, the ratio of the torque that is transmitted from the transmission 26 to the propeller shafts 32 and 34 can readily be controlled by the setting of the ball check element 172. The greater is the opening at the port in which ball check valve element 172 is seated, the greater will be the amount of relative rotation that can occur between the rotary elements 90 and 112. The greater the amount of relative rotation, the smaller will be the percentage of the torque that is transmitted to the shaft 32 as compared with the torque that is transmitted to the propeller shaft 34.

It is to be understood that suitable seals are provided between the shaft 30 and the rotary element 90 as well as between the various segments of the rotary element 90 so that leakage will not occur from the cavity defined by the interior of the rotary element 90. The annular grooves or passageways 182 and 184 are located so that if leakage occurs between the segments 94 and 96, such fluid will be displaced into these annular passageways 182 and 184 to provide additional source of hydraulic fluid for transfer back to the pressure chambers 116 during the suction strokes of the pistons 124.

In the illustrated embodiment of the torque transmitting assembly 28, a total of nine pressure chambers are arranged equiangularly about the axis of rotation of the cam surfaces 114 so that the pressure chambers are disposed 40° apart. The cam surfaces 114 are shaped so that when relative rotation occurs between the rotary element 90 and the rotary element 112, the pistons in each set reciprocate out of phase with the pistons of the other sets and transfer fluid between the chambers via the ball check valve element 172 to the extent permitted by this element. The pressure chambers and the cam surfaces are constructed so that when relative rotation occurs between said rotary elements 90 and 112, the volumetric displacement of one set of pistons for one selected time interval is substantially equal to the algebraic sum of the volumetric displacement of the other two sets of pistons. For a detailed description of a construction of this type, reference is made to U.S. Pat. No. 3,393,583.

The selector means 190 will now be described with particular reference to FIG. 5. As there shown, the selector means 190 projects into the bore in the segment 94 which defines the chamber 174, and it includes the plunger 192 in which is seated the annular cup-shaped member 194. A spring actuated element 196 has a stem which is reciprocally mounted within the cup-shaped member 194 and is spring biased by the compression spring 198 against the ball element 172 to close the port from the chamber 162. The plunger 192 is retained in the bore which defines chamber 174 by a lock ring 200 which limits the extent that the plunger 192 can be withdrawn from the chamber 174. A splined connection is provided between the bore 174 and the plunger 192 to prevent relative turning of the plunger 192, and abutments are provided at 202 and 204 to limit the extent to which the plunger 192 can be advanced into the chamber 174.

Threadedly connected to the bore of the stem 206 is an adjustment element or screw 208 which can be advanced inwardly to move the cup-shaped element 194 inwardly to compress the spring 198 and thereby to establish the pressure within the chamber 162 that is necessary to unseat the ball valve element 172. Thus, the farther the cup-shaped element 194 is advanced into the chamber 174, the greater will be the compression on the spring 198, thereby increasing the load necessary to open the valve element 172. For the purpose of adjusting the setting of the adjustment element or screw 208, a wrench 210 is provided which can be inserted into the socket in the end of the adjustment element 208 for turning the latter. For the purpose of carrying out this operation, a socket 212 for an externally applied wrench is provided.

It will be recognized that when turning of the rotary element 90 occurs, the entire selector means 190 will rotate with it by virtue of the splined connection between the plunger element 192 and the segment 94. For this purpose a bearing mounting is provided at 214 to permit relative turning between moving portions of the selector means 190 and the supporting structure which is connected to the stationary housing 78.

Figure 11:
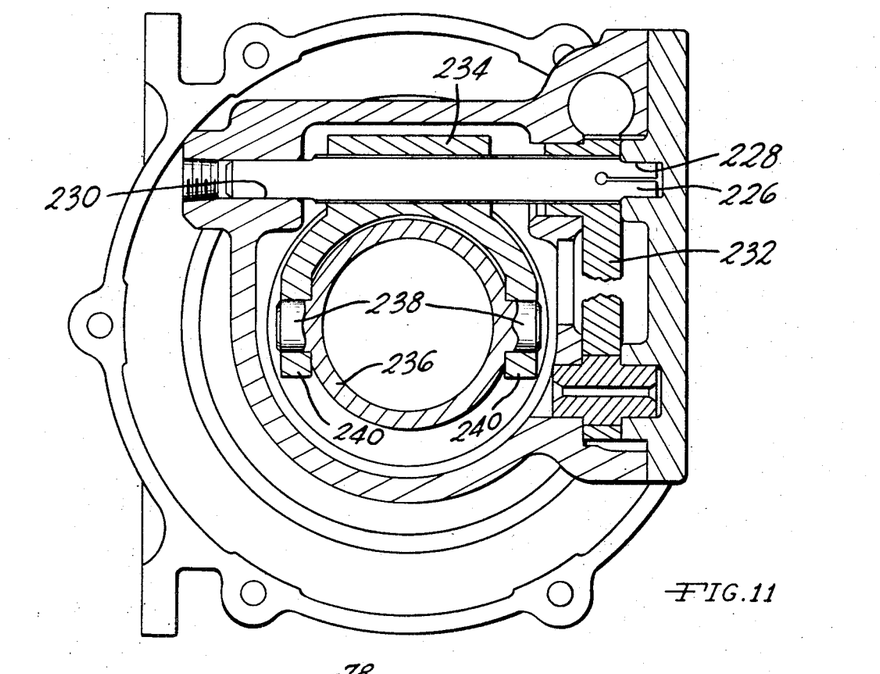
FIG. 11 is a vertical section taken on the line 11-11 of FIG. 12 with portions removed showing the remote control mechanism for selectively locking the torque transmitting assembly in either of two positions.
Figure 12:
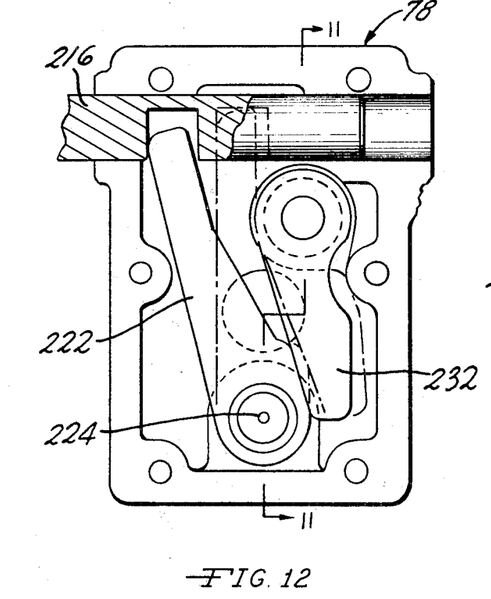
FIG. 12 is a fragmentary view partly in section, illustrating the remote control means as viewed from the right side of FIG. 11, after removal of a cover.
Figure 13:
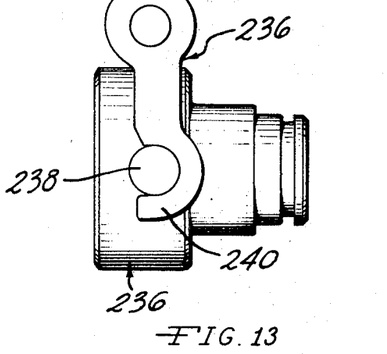
FIG. 13 is a side elevational view illustrating a portion of the mechanism for selectively locking the device in position.

Attention is now directed to FIGS. 11, 12 and 13 in conjunction with FIG. 5 for a description of a remote control means 216 for selectively locking the torque transmitting assembly in a position wherein the maximum load is applied to the selector means 190 to substantially restrict opening of the valve element 172, thereby assuring that when needed maximum torque can be transmitted from the input member 106 to the output shaft 30.

The remote control means 216 includes a shift rod 218 which is axially movable in the bore 220 in the stationary housing 78, a shift lever 222 which is pivotally mounted at 224 in the housing 78, a shaft 226 which is mounted at 228 and 230 for turning about its axis, and an arm 232 which is splined to the shaft 226 for pivotal movement during rotation of the shaft 226, a yoke 234 which is splined to the shaft 226, a shift collar 236 which has trunnions 238 which are engaged by the C-shaped ends 240 of the yoke 234, the shift ring 242 forming the retainer of the bearing 214, and the compression spring 244 positioned between the collar 236 and the housing 78 for urging the plunger 192 to a forward position.

In the normal operation of the remote control means 216, the operator of the vehicle can advance the shift rod 218 to the left, as viewed in FIG. 5, and this will have the effect of moving the shift lever 222 in the direction to the position shown in phantom lines in FIG. 12. This forward movement of the shift lever 222 will pivot the arm 232 to the position shown in phantom lines and when this occurs, rotation of the shaft 226 will occur causing the yoke 234 to advance the collar 236 and its associated ring 242 in a forward direction against the shoulder 246 of the plunger 192, thereby advancing the latter to its most forward position, locking the ball element 172 in the output port of the chamber 162.

Thus, by virtue of this arrangement the operator of the vehicle can selectively shift the torque transmitting assembly to a position wherein no slippage can occur between the output member 30 and the input member 106, thereby assuring full transmission of torque through the unit. However, in other instances where it is desirable to vary the ratio of the torque to the propeller shaft 32 as compared with the torque delivered to the propeller shaft 34, this can be accomplished by moving the shift lever 222 to its normal position, shown in FIG. 5, and advancing the wrench 210 inwardly to a position for turning the adjustment screw or element 208 to a position where a preloaded spring setting is established for determining when an opening from the chamber 162 can be realized. When an opening occurs at a preselected pressure condition, limited differential action can occur between the elements 90 and 112, thereby setting the ratio of torque that is transmitted to the shaft 30 and thereby to the propeller shaft 32.

It will be noted that the housing 78 is provided with a fluid inlet port 248, and this inlet port is used to charge the system with fluid. By virtue of the illustrated arrangement, all of the movable parts of the torque transmitting assembly are contained in hydraulic fluid. Optimum operating conditions are realized when no air is present in the interior of the housing 78, and to compensate for thermal expansion of the hydraulic fluid in the sealed unit, the inlet port 248 will normally be in communication with a closed reservoir which will contain a suitable means or mechanism for compensating for pressure increases of the fluid that may occur because of temperature changes of the hydraulic fluid. Suitable means or mechanism of this type are disclosed in U.S. Pat. No. 3,393,583.

I claim:

1. A torque transmitting assembly comprising a rotary input member, a pair of rotary output members, said input member being drivingly connected to one of said output members, a torque transmitting mechanism operatively coupled between the other of said output members and the connected input member and one output member, said torque transmitting mechanism including selector means for selectively proportioning the torque transmitted by said input member to said output members.

2. A torque transmitting assembly as is defined by claim 1, wherein said mechanism includes remotely controlled means for selectively locking the mechanism in a position wherein the torque is transmitted substantially equally to said output members.

3. A torque transmitting assembly as is defined by claim 1, wherein said mechanism includes a first rotary element connected to said input member for rotation therewith, a second rotary element connected to the other of said output members for rotation therewith, and hydraulic means having a normally closed circuit coupling said rotary elements together for corotation while said circuit is closed and permitting limited differential action of said rotary elements while said circuit is open, said selector means being responsive to the pressure of the fluid in said hydraulic means above a selected magnitude corresponding to the selected setting of the selector means to open said circuit.

4. A torque transmitting assembly as is defined by claim 3, wherein said selector means includes a valve element in said circuit, a biasing element normally urging the valve element to a closed position for maintaining the circuit closed, and an adjustment element for selectively varying the magnitude of the pressure by which the biasing element urges the valve element closed.

5. A torque transmitting assembly comprising a stationary housing, a first rotary element journaled in said housing, a rotary input member extending into said housing connected for rotation with said first rotary element, a secondary rotary element coaxially disposed adjacent to said first rotary element, a first rotary output member extending into said housing connected for rotation with said second rotary element, a second rotary output member connected for rotation with said input member, hydraulic means normally coupling said rotary elements together and operable under predetermined hydraulic fluid pressure conditions to transmit a selected ratio of the input torque from the input member to said first rotary output member with the remainder of the torque being transmitted from the input member to said second rotary output member, and selector means for setting the predetermined hydraulic pressure conditions under which said hydraulic means will operate so as to set the ratio of torque transmitted to said output members.

6. A torque transmitting assembly as is defined by claim 5, wherein one of said rotary elements contains a plurality of radially opening pressure chambers facing the other rotary element, said other rotary element including radially directed rise and fall cam surfaces, and said hydraulic means includes pistons in said chambers in engagement with said cam surfaces and reciprocable in response to differential rotation of said elements, said pistons and their associated chambers being in a plurality of sets, passage means in fluid communication with the chambers of each set through which hydraulic fluid will flow from one set of chambers to another when said pistons reciprocate, and a normally closed spring loaded valve element in said passage means preventing fluid communication between said sets of chambers when closed and when open regulating the rate that fluid can flow between said sets of chambers, said selector means including an adjustment element for selectively setting the spring-loading of said valve element.

7. A torque transmitting assembly as is defined by claim 6, wherein remote control means are operatively connected to said valve element and movable to a first position for holding the same in a closed position and to a second position wherein the valve element is released to its selectively set condition.

8. A torque transmitting assembly as is defined by claim 5, wherein said rotary input member and said first rotary element are connected by meshed gears.

9. A torque transmitting assembly as is defined by claim 8, wherein said gears include an external ring gear removably mounted on said first rotary element and an input gear removably mounted in mesh therewith so that the pair of removable gears can be changed with another set.